Nov. 10, 1970    J. A. P. CROFT    3,538,558
AUTOMOBILE SAFETY BELT BUCKLES
Filed May 6, 1968    4 Sheets-Sheet 1
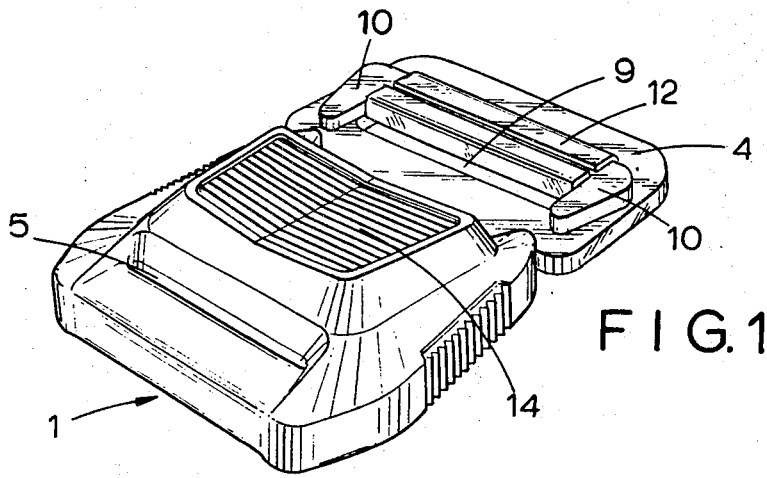
FIG. 1.
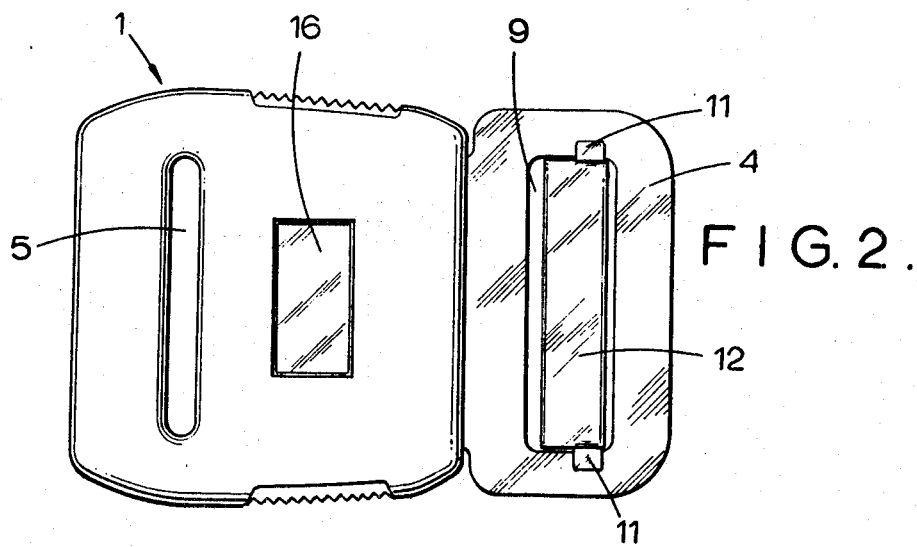
FIG. 2.
FIG. 3.
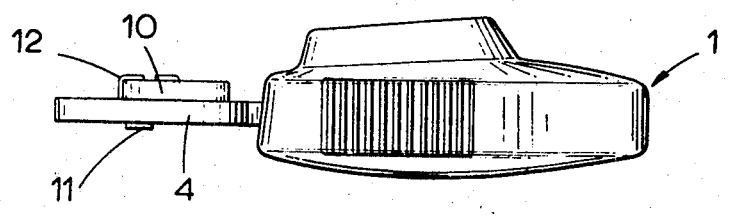

Nov. 10, 1970   J. A. P. CROFT   3,538,558
AUTOMOBILE SAFETY BELT BUCKLES
Filed May 6, 1968   4 Sheets-Sheet 2

United States Patent Office 3,538,558
Patented Nov. 10, 1970

3,538,558
AUTOMOBILE SAFETY BELT BUCKLES
John Arthur Phillip Croft, Kings Langley, England, assignor to Romac Industries Limited, of The Hyde, Hendon, London, England
Filed May 6, 1968, Ser. No. 726,949
Claims priority, application Great Britain, May 10, 1967, 21,698/67; Sept. 19, 1967, 42,715/67
Int. Cl. A44b *11/26*
U.S. Cl. 24—230                              3 Claims

ABSTRACT OF THE DISCLOSURE

A buckle comprising a body assembly and a tongue designed so that the body assembly can be made predominently of plastics material, reinforced where necessary by steel, and so that the tongue can snap easily into the body assembly and be quickly released by finger pressure on a button or lever.

---

According to the invention, a safety belt buckle includes a body assembly and a tongue, the body assembly having a body formed with a mouth arranged to receive the tongue slidably therein, a latch movable into or out of engagement with the tongue in a direction normal to the direction of entry of the tongue, resilient means uring the latch towards its engaged position, and externally accessible release manual means enabling the latch to be disengaged from the tongue. Advantageously the latch comprises a central guide pillar, two lateral ramps at one end of the pillar and normally projecting into the mouth, and an external release button or lever at the other end of the pillar. Where a finger actuated lever is arranged to operate the latch, a very useful mechanical advantage may be obtained.

In order that the invention may be clearly understood and readily carried into effect, automobile safety belt buckles in accordance therewith will now be described, by way of example, with reference to the accompanying drawings, in which:

FIG. 1 is a perspective view of the buckle having a body and tongue assembled together, FIGS. 2, 3 and 4 are respectively a plan, side view and end view of the assembly of FIG. 1.

Figure 4:
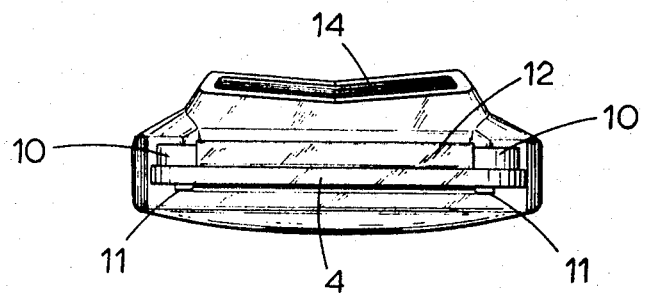
Figure 5:
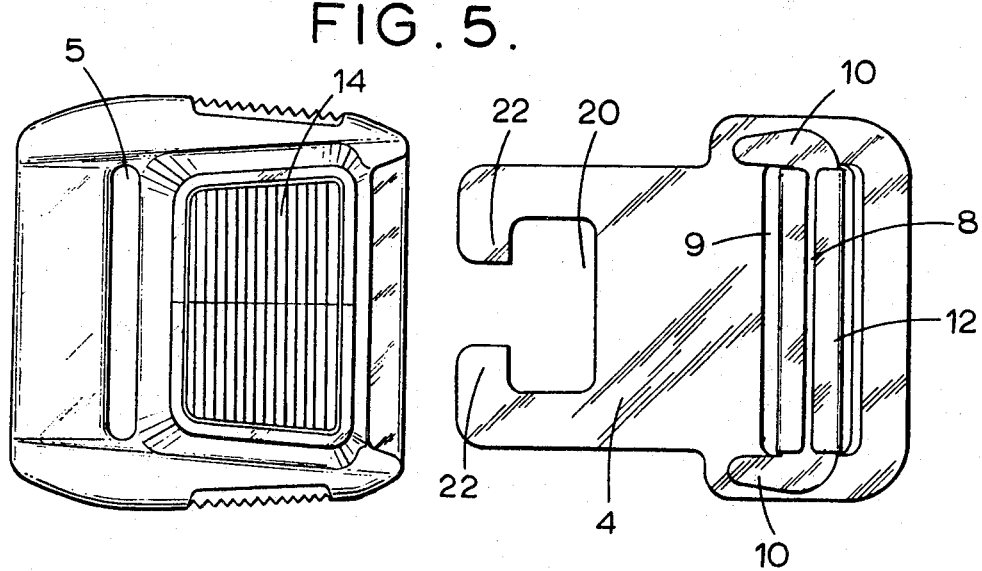
FIG. 5 is a plan showing the body and tongue separated.
Figure 6:
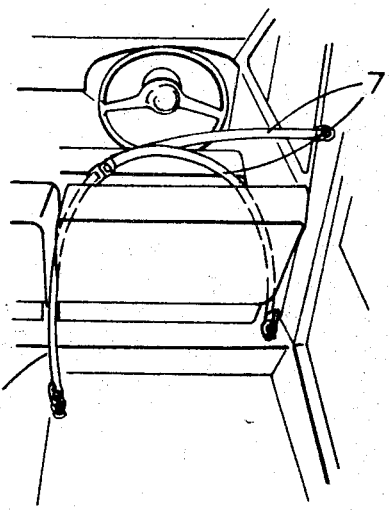
FIG. 6 is a perspective view of part of the interior of an automobile showing the buckle positioned therein.
Figure 7:
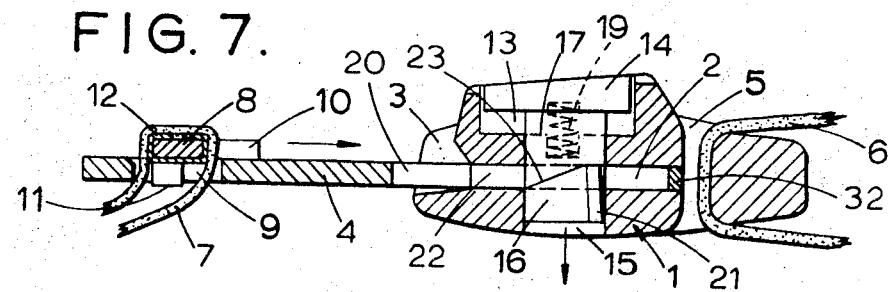
FIGS. 7, 8 and 9 are similar sectional elevations showing the disposition of the parts when the tongue is being inserted, locked in position and withdrawn.
Figure 8:
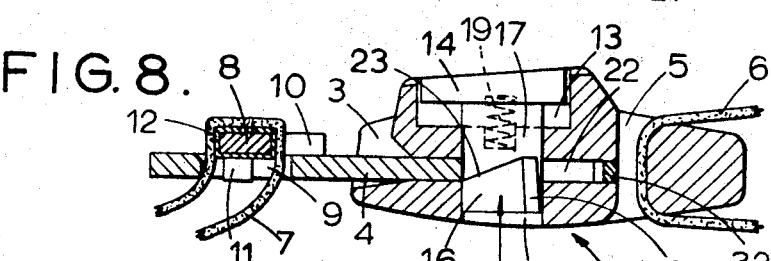
Figure 9:
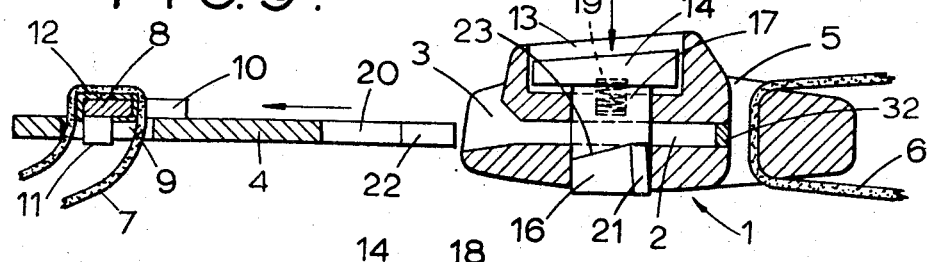
Figure 10:
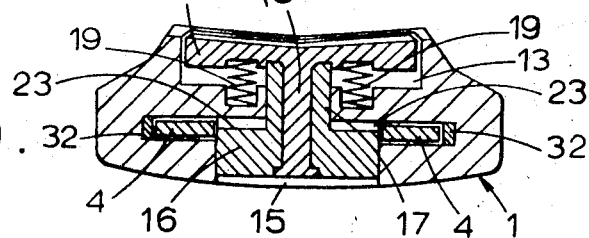
FIG. 10 is a cross-section taken on FIG. 8.

Referring to the buckle of FIGS. 1 to 10, a body 1, shown full size in FIGS. 2 to 5, is formed with a mouth 2 having a flared opening 3 for receiving one end of a tongue 4, a substantial portion of which can be accommodated within the body 1. The end of the body remote from the mouth 3 is formed with a slot 5, through which one portion 6 of the safety belt passes. The other portion 7 of the belt is looped as shown in FIG. 7 to 9 over a slide attachment piece 8 on the tongue 4. The attachment piece 8 is slidably mounted over an opening 9, being guided by fingers 10 on one face of the tongue 4 and by small tabs 11 extending through the opening 9 and over the other face, the tabs 11 being formed on a sheet 12 wrapped round the body of the piece 8.

The body 1 is formed with a transverse passage, which is at right-angles to the mouth 3 and which comprises a wide end 13 (FIG. 10), containing a buckle release button 14, joined by a comparatively narrow part to a widened portion 15. The button 14 is fixed to a latch including a buckle release unit 16 contained in the widened portion 15 of the transverse passage. The button 14 is fixed to the latch by being clamped against the end of a central guide pillar 17, extending from the release unit 16, a pin 18 in the button 14 passing through the pillar 17 and unit 16 and being made secure at its free end. The release unit 16 is formed with ramps 23 on each side of the pillar 17.

Springs 19 normally maintain the button and release unit assembly in the position of FIGS. 1 and 8, with the top of the button 14 flush with the outer surface of the body 1. In this position, when the buckle is made secure, the pillar 17 passes through an opening 20 (FIG. 5) in the tongue 4, and a steel plate 21, on the release unit 16, prevents withdrawal of the tongue 4 by engaging limbs 22 on the tongue 4. A metal insert 32 is moulded into the body 1 to give strength round the mouth 2 at the end remote from that into which the tongue 4 is inserted. The insert 32 consists of a flat steel bar bent so as to provide a transverse portion with portions at right-angles thereto that extend along opposite sides of the mouth 2. The plate 21, springs 19 and the insert 32 are the only metal parts of the body 1, which is otherwise entirely made of the plastics material known as "black nylon" or "Delrin." The tongue assembly is of steel.

When it is desired to release the tongue 4, the button 14 is depressed, against the action of the springs 19, so as to carry the release unit 16 out of the way of the limbs 22. The tongue 4 can then be separated completely from the body 1. To relatch the tongue, it is merely necessary to thrust the tongue 4 into the mouth 3 so that its forward end engages the ramps 23 on the release unit 16 so as to depress the release unit 16 until it is in register with the opening 20, whereupon it springs into the latching position.

The unit 11, 12 on the attachment piece 8 may be made of a strong rigid plastics material and clipped on to the piece 8. This alternative is cheaper than stainless steel but quite effective.

Figure 11:
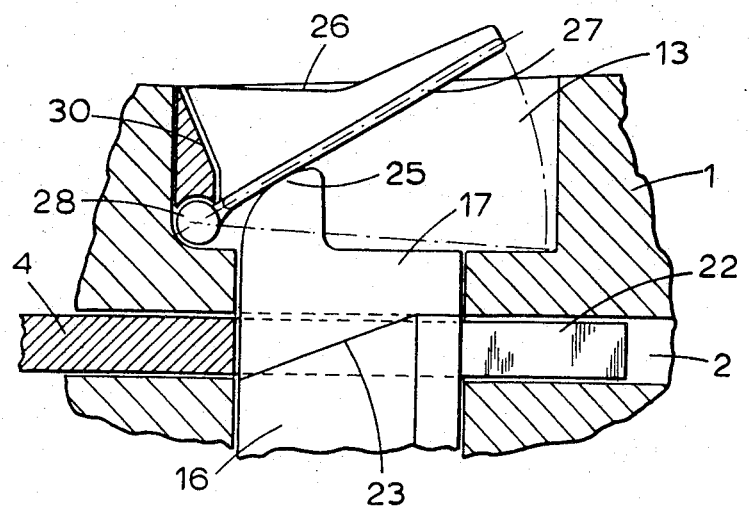
FIGS. 11 and 12 are sectional elevations of a portion of a modification of the buckle of FIGS. 1 to 10, shown on an enlarged scale, FIG. 11 showing the latched condition and FIG. 12 the released condition.
Figure 12:
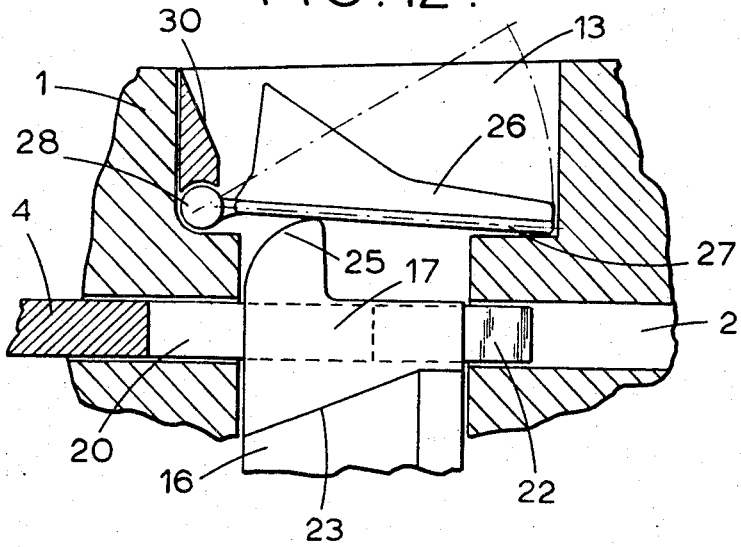
Figure 13:
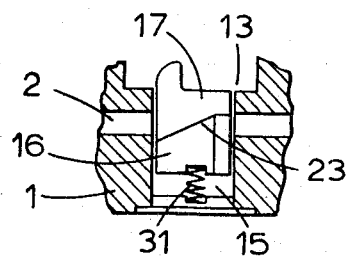
FIG. 13 is a sectional elevation showing a somewhat different portion of the buckle of FIGS. 11 and 12.

Referring now to the modification of FIGS. 11 to 13, in which the same reference numerals are used for those parts that are equivalent to parts in FIGS. 1 to 10, the buckle comprises a body 1 formed with a mouth 2 for receiving one end of a tongue 4. As in the previous example of FIGS. 1 to 10, the body 1 is formed with a transverse passage which is at right-angles to the mouth 2 and which comprises a wide end 13 joined by a comparatively narrow part to a widened portion 15 containing a buckle release unit 16. A central guide pillar 17 extends upwards from the release unit but, unlike the design of FIGS. 1 to 10, is formed with a cam profile 25 that is acted on by a pivoted finger lever 26.

The finger lever 26 consists of a body of plastics material held in a metal frame 27 extending from a fulcrum 28 in a lower corner of the wide end 13 of the transverse passage. A compression spring 31 (FIG. 13) maintains the unit 16, 17 in the raised position of FIG. 11. In this position the tongue 4 is latched in the body 1 because the buckle release unit 16 lies in an opening 20 in the tongue 4 with a metal plate 21 engaging two limbs 22 on opposite sides of the tongue 4. There is a gap between the limbs 22 so that, when the lever 26 is pressed down to the position of FIG. 12, the release unit 16 is forced out of register with the limbs 22 which can then travel along the mouth 2 on opposite sides of the narrower guide pillar 17.

The tongue 4 can be relatched simply by thrusting it into the mouth 2 so that the limbs 22 ride over ramps 23 on the release unit 16 to take up the position of FIG. 11. A light hairpin spring (not shown) is provided to hold the lever 26 in its outermost position while the tongue 4 is being thrust into the latched position.

In the example shown in FIGS. 11 to 13, the value of the mechanical advantage provided by the lever 26, assuming it to be depressed at its extremity, varies from 4 in the state of FIG. 11 to 3.3 in the state of FIG. 12.

I claim:

1. In a safety belt buckle arrangement including a body assembly and a tongue, said body assembly including a body formed with a mouth for receiving said tongue and with a transverse passage located at right angles to said mouth and including a wide end, a latch member mounted for sliding movement to-and-fro in said passage and including a pillar having a portion which normally lies in said wide end of said passage and two lateral ramps on opposite sides of said pillar and normally projecting into said mouth, and a spring for acting on said latch to bias said latch into a normal position thereof, said tongue including limbs which slide over said ramps during the movement of said tongue to the latch position thereof so as to press said latch into an ineffective position, said tongue freeing said latch so that said latch is returned by said spring to the latching position thereof wherein said latch engages said limbs, when said tongue reaches the latched position thereof, the improvement comprising a cam surface formed on said latch and normally extending into the wide end of said passage, a finger-actuated lever for engaging said cam surface, and means for pivotally mounting said lever at one end thereof in said wide end of said passage so that the other end of the lever is free to be pressed into said wide end of said passage to cause movement of said latch against the biasing action of said spring so as to effect release of said tongue, said cam surface being positioned to engage said lever at a location at least as close to the axis about which said lever is pivotally mounted as the center of the length of said lever.

2. An arrangement as claimed in claim 1 wherein said cam surface engages said lever at a location substantially closer to said axis than said center of the length of said lever.

3. An arrangement as claimed in claim 2 wherein said body is constructed of plastics material and includes a reinforcing metal insert which extends around the end and sides of said mouth.

References Cited

UNITED STATES PATENTS

| | | |
|---|---|---|
| 3,066,375 | 12/1962 | Knowles. |
| 3,099,870 | 8/1963 | Seeler. |
| 3,203,065 | 8/1965 | Hoppenstand. |
| 3,242,547 | 3/1966 | Krengel. |

FOREIGN PATENTS

| | | |
|---|---|---|
| 1,328,405 | 4/1963 | France. |

BERNARD A. GELAK, Primary Examiner